(12) United States Patent
Shindo et al.

(10) Patent No.: US 6,210,458 B1
(45) Date of Patent: Apr. 3, 2001

(54) GAS FILTER MODULE HAVING TWO-PART FILTER AND METHOD OF PRODUCING THE SAME

(75) Inventors: Toyohiko Shindo, Tokyo; Koichi Imura, Kanagawa; Takafumi Imaizumi, Kanagawa; Hiroyuki Ichikawa, Kanagawa; Kazuyuki Ohshima, Aichi; Takeshi Iwasaki, Kanagawa, all of (JP)

(73) Assignee: Toshiba Ceramics Co., Ltd., Tokyo (JP)

( * ) Notice: Subject to any disclaimer, the term of this patent is extended or adjusted under 35 U.S.C. 154(b) by 0 days.

(21) Appl. No.: 09/220,348

(22) Filed: Dec. 24, 1998

(30) Foreign Application Priority Data

Dec. 26, 1997 (JP) ................................... 9-366704

(51) Int. Cl.$^7$ .............................. B01D 35/02; B01D 46/24
(52) U.S. Cl. ................................ 55/486; 55/502; 55/523; 264/632; 264/642; 264/655
(58) Field of Search .............................. 55/486, 487, 489, 55/502, 503, 523; 210/496, 500.26, 510.1; 264/632, 642, 655

(56) References Cited

U.S. PATENT DOCUMENTS

| | | | |
|---|---|---|---|
| 4,810,273 | * 3/1989 | Komoda | 55/487 |
| 4,894,070 | * 1/1990 | Keidel et al. | 210/510.1 |
| 5,089,134 | * 2/1992 | Ando et al. | 210/496 |
| 5,490,868 | * 2/1996 | Whitlock et al. | 55/503 |
| 5,545,242 | * 8/1996 | Whitlock et al. | 55/502 |

FOREIGN PATENT DOCUMENTS

| | | |
|---|---|---|
| 3-288504 | 12/1991 | (JO) . |
| 62-129104 | 6/1987 | (JP) . |
| 2-172511 | 7/1990 | (JP) . |
| 04330910 | * 11/1992 | (JP) . |
| 4-349912 | * 12/1992 | (JP) . |

* cited by examiner

Primary Examiner—David A. Simmons
Assistant Examiner—Frank M. Lawrence
(74) Attorney, Agent, or Firm—Foley & Lardner

(57) ABSTRACT

The gas filter module of the invention has: a housing which has a gas inlet port at one end and a gas outlet port at another end, and which is divided into two portions in a longitudinal direction; a filter body consisting of a porous ceramics member which is loaded into the housing and through which an inflow gas passes; and a ring-like support member consisting of dense ceramics which is fittingly coupled to a step portion formed inside the housing and which is joined to the filter body. The ring-like support member is fixed via two metal O-rings to a fixing gap of the step portion of the housing.

14 Claims, 8 Drawing Sheets

PRIOR ART

GAS FILTER MODULE HAVING TWO-PART FILTER AND METHOD OF PRODUCING THE SAME

BACKGROUND OF THE INVENTION

1. Field of the Invention

The present invention relates to a gas filter module which is suitable for filtration of a dry gas used in, for example, a production process of a semiconductor device, and a method of producing such a gas filter module.

2. Description of Related Art

Recently, as the performance and capacity of a semiconductor device are advancing, miniaturization and thinning of a device or a pattern are further expanded. According to advancement of miniaturization of a pattern and the like, also in various gas flows used in a production process, it is requested to remove fine particles (impurities) for the gas flows as much as possible.

In order to meet such a request, for example, JP-A-3-288504 (Unexamined Japanese Patent Publication (Kokai)) discloses a gas filter module having the following configuration. The gas filter module comprises a metal case having a gas inlet port and a gas outlet port, and a cylindrical (tubular) gas filter which is disposed in a gas flow path in the metal case. A shield member (made of, for example, a fluororesin) is disposed in a gap between the metal case and the gas filter. The gas filter is made of a porous member of ceramics such as alumina, and is disposed in the metal case so as to block the gas flow path. The shield member is fixed to the gas filter and the metal case so that a gas which once flows into the case via the inlet port cannot flow out via the outlet port unless it passes through a wall portion of the gas filter.

In the case where the shield member is made of an organic material such as a fluororesin, there is a fear that when the gas filter is subjected to a baking process (600° C.) before it is used, for example, the organic material is decomposed to release a hydrocarbon gas, water vapor, and the like and such gasses are supplied as an impurity gas into the metal case. Furthermore, an organic material easily occludes various materials, and hence there is a further fear that occluded gasses are released as an impurity gas into the supply gas flow.

In order to comply with the problems which may arise in a practical use, a technique that the material of the shield member is changed to ceramics or a metal has been attempted. Specifically, a configuration is proposed in which the shield member is made of ceramics or a metal and the shield member is fixedly supported on a tubular gas filter element by a glass material or a metal solder material (JP-A 62-129104 and JP-A 2-172511).

In such a configuration, an impurity gas is prevented from flowing into the supply gas, and thermal deformation or the like is prevented from occurring. In this configuration, the ceramics shield member is so dense (gas impermeable) that a gas cannot pass through the member. In a gas filter (a plastics-free ceramics gas filter) or a gas filter module (a ceramics gas filter module of plastic free) in which the shield member is made of ceramics, it is possible to avoid or solve the problem in that, during a process where a gas is passed (or filtered) through the tubular gas filter element, the gas is contaminated with an impurity gas. However, such a gas filter or a gas filter module has the following disadvantage. When the tubular gas filter element made of ceramics and the shield member are integrally fixed to each other by a glass bonding agent (of the silica type or glaze), the assembling operation can be simplified. On the other hand, when a fluoric gas such as $ClF_3$ is filtered and cleaned, the glass bonding agent is easily eroded. Therefore, the kind of a gas which can be filtered and cleaned is restricted, thereby producing a problem in that such a filter or filter module lacks versatility.

For example, the erosion resistance was checked by using a fluorine plasma under the following conditions (microwave output power: 560 W, carbon tetrafluoride: 155 sccm., oxygen: 75 sccm., exposure time: 20 min×5 times, and pressure: 0.17 torr). In a porous alumina member of a purity of 99.5%, the weight reduction rate was 0%. By contrast, in a porous alumina member (purity: 92%) joined (adhered) by aluminosilicate glass, the weight reduction rate was 1.7 to 1.9%.

A gas filter module in which the shield member is made of a dense metal or ceramics and the member is fixed to a ceramics filter and a metal case is proposed (JP-A HEI3-288504). As a specific method of fixing the metal case and the shield member, disclosed is a method in which, when two bottomed cylinders constituting the metal case are to be welded to each other, the cylinders are welded while clamping the shield member between the cylinders, whereby the metal case is formed and the metal case and the shield member are fixed to each other. In this case, when the clamping and joining portion of each of the two bottomed cylinders and the shield member does not have a high flatness, however, a gas leak occurs and the filtering function cannot be sufficiently performed. When a highly corrosive gas such as $ClF_3$ for cleaning the interior of a semiconductor producing apparatus is passed through such a filter or a filter module, there arises a problem in that, particularly, the welded portion of the metal case is corroded. In order to prevent this problem from occurring, a sophisticated process technique is required. Therefore, such a filter or a filter module fails to have sufficient practicality. When such a filter is to be used for producing a semiconductor device, $H_2O$ and $O_2$ adsorbed by the filter are removed away prior, to the use by baking the whole of the filter including the case at a high temperature of about 600° C. Also in the case where the gas to be used is changed, a similar baking process is conducted. In this way, particularly, a filter for producing a semiconductor device repeatedly undergoes a temperature change from room temperature to 600° C. Particularly in the case where dense ceramics is used as the shield member, even when a flat face of a high accuracy is attained in an initial stage, a gap is gradually formed because the coefficient of thermal expansion of the ceramic material is largely different from that of the metal material constituting the metal case, thereby producing a problem in that a gas leak occurs.

Conventionally, a ceramics filter which is used as a gas filter has a structure shown in FIG. 13.

Referring to FIG. 13, 1 denotes a housing made of a metal such as stainless steel. The housing 1 consists of a housing rear portion 11, and a housing front portion 12, and is assembled by welding the portions together at a welding area 2 which is in a substantially middle area. A gas inlet port 3 for a gas to be filtered, and a gas outlet port 4 for a filtered gas are formed in the housing rear and front portions 11 and 12 of the housing 1, respectively. An inner space 5 is formed inside the center portion of the housing 1. A filter element 6 is disposed in the space so as to form a gap 8 between the element and the inner wall 7 of the housing 1. The filter element 6 is configured by a porous alumina member, and has a tubular shape as illustrated. The element is clamped at the longitudinal front and rear ends by packings $9_1$ and $9_2$ made of a synthetic resin such as Teflon. A press plate 10 is disposed outside the synthetic resin packing $9_1$ on the side of the housing rear portion 11 of the filter element 6, so as to grasp the packing $9_1$. A gas passage $1_1$ through which a gas can pass is opened in the press plate 10 so that an inlet gas is guided to the outside of the filter element 6.

When a gas is to be filtered by using the ceramics filter, the gas to be filtered flows into from a gas inlet pipe (not shown) connected to the gas inlet port 3 of the ceramics filter, though the gas inlet port 3. The gas passes through the gas passage $1_1$ opened in the press plate 10 and then reaches the gap 8 outside the filter element 6. The gas which has entered the gap 8 then passes through the interior of the filter element 6 as indicated by the arrows, whereby the gas is filtered and guided to the center portion of the filter element 6. Thereafter, the gas is sent from the center portion of the front end of the filter element 6 toward the housing front portion 12, and then discharged from the gas outlet port 4.

In the thus configured ceramics filter of the prior art, a synthetic resin such as Teflon is used as the packings serving as the shield member. Therefore, the filter has problems in that a gas is released in a high vacuum condition, and that the synthetic resin is deteriorated by the baking process or the like, hereby limiting the use of the filter. It has been requested to improve a filter.

SUMMARY OF THE INVENTION

The invention has been conducted in view of the above-discussed circumstances. It is an object of the invention to provide a gas filter module of plastic free or glass free in which a fear of an inflow of an impurity gas during a filtering process can be eliminated, and which can perform filtering and cleaning irrespective of the kind of a gas so as to enhance the versatility, and also a method of producing such a gas filter module.

In the invention, metal O-rings are used as a shield member, a ring-like ceramics support member disposed on the filter body is clamped by the metal O-rings and the filter body is fixed into the housing of the filter, so as not to use a shield member (packing) made of a synthetic resin, thereby obtaining a ceramics filter which is excellent also in heat resistance.

In a first aspect of the invention, a gas filter module is provided wherein the gas filter module comprises: a housing which has a gas inlet port at one end and a gas outlet port at another end, and which is divided into two portions in a longitudinal direction; a filter body consisting of a porous ceramics member which is loaded into the housing and through which an inflow gas passes; and a ring-like support member consisting of dense ceramics which is fittingly coupled to a step portion formed inside the housing and which is joined to the filter body, and the ring-like support member is fixed via two metal O-rings to a fixing gap of the step portion of the housing.

In a second aspect of the invention, a gas filter module is provided wherein, in the first aspect, the filter body has a tubular shape and is loaded in a space in the housing with leaving in an outer periphery a gap through which a gas passes, and the filter body consists of a porous ceramics member in which a porous ceramics membrane that practically filters the inflow gas is formed on an inner face of the porous ceramics member.

In a third aspect of the invention, a gas filter module is provided wherein, in the second aspect, an end portion of the filter body on the side of the gas inlet is closed by a dense ceramics plate.

In a fourth aspect of the invention, a gas filter module is provided wherein, in the second aspect, an end portion of the filter body on the side of the gas inlet is sealed by a dome-like member which is made of a same material as a material of the porous ceramics member constituting the filter body.

In a fifth aspect of the invention, a gas filter module is provided wherein, in the first aspect, the filter body has a plate-like shape, and is loaded in a space in the housing with setting a flat portion of the filter body to be substantially perpendicular to a gas flow direction, and the filter body consists of a porous ceramics member in which a porous ceramics membrane that practically filters the inflow gas is formed on a surface on a gas outlet side.

In a sixth aspect of the invention, a gas filter module is provided wherein, in the second aspect, the metal O-rings have a sectorial shape in section, a pivot side of the sectorial shape is positioned on the side of the housing, and a wider side of the sectorial shape is positioned on the side of the ring-like support member joined to the filter body.

In a seventh aspect of the invention, a gas filter module is provided wherein, in the fifth aspect, the metal O-rings have a sectorial shape in section, a pivot side of the sectorial shape is positioned on the side of the housing, and a wider side of the sectorial shape is positioned on the side of the ring-like support member joined to the filter body.

In an eighth aspect of the invention, a gas filter module is provided wherein, the sixth aspect, the portion where the filter body and the ring-like support member are joined together is made of high-purity porous ceramics, and a pore diameter of the high-purity porous ceramics constituting the joined portion is substantially equal to or smaller than at least a pore diameter of the porous ceramics membrane of the filter body.

In a ninth aspect of the invention, a gas filter module is provided wherein, in the seventh aspect, the portion where the filter body and the ring-like support member are joined together is made of high-purity porous ceramics, and a pore diameter of the high-purity porous ceramics constituting the joined portion is substantially equal to or smaller than at least a pore diameter of the porous ceramics member of the filter body.

In a tenth aspect of the invention, a gas filter module is provided wherein, in the eighth aspect, both the filter body and the ring-like support member consist of an alumina composition of 99.9 wt. % or higher.

In an eleventh aspect of the invention, a gas filter module is provided wherein, in the first aspect, the filter body and the ring-like support member are integrated with each other by shrink fitting.

In a twelfth aspect of the invention, a gas filter module is provided wherein, in the ninth aspect, the filter body and the ring-like support member are integrated with each other by shrink fitting joining.

In a thirteenth aspect of the invention, a gas filter module is provided wherein, in the third aspect, the filter body and the dense ceramics plate are integrated with each other by shrink fitting joining.

In a fourteenth aspect of the invention, a method of producing a gas filter module is provided wherein the method comprises the steps of: positioning and fitting a filter body to a predetermined portion of a ring-like support member made of ceramics which is calcined to a state immediately before final shrink is completed and which can be densed, the filter body consisting of a porous calcined ceramics member, a face of the filter body which is to be joined being ground; conducting a heating process on the fitted article of the ring-like support member and the filter body at a final sintering temperature, thereby shrink fitting the ring-like support member and the filter body to be integrated with each other; preparing a housing having a gas inlet port and a gas outlet port; and attaching the ring-like support member integrated with the filter body, into the housing.

In a fifteenth aspect of the invention, a method of producing a gas filter module is provided wherein, in the fourteenth aspect, the shrink fitting and integrating step comprises a step of, prior to the heating process, filling slurry for shielding into a fitting portion of the filter body and the ring-like support member.

In a sixteenth aspect of the invention, a method of producing a gas filter module is provided wherein, in the fifteenth aspect, the filter body is formed into a tubular shape, and, after the shrink fitting and integration, a porous ceramics membrane is formed on an inner wall face of the filter body.

In a seventeenth aspect of the invention, a method of producing a gas filter module is provided wherein, in the fifteenth aspect, the filter body is formed into a plate-like shape, and after the shrink fitting and integration, a porous ceramics membrane to a surface of the filter body on a gas outflow side.

In a eighteenth aspect of the invention, a method of producing a gas filter module is provided wherein, in the sixteenth aspect, the slurry for shielding is slurry for forming a porous ceramics membrane, and the method further comprises a step of simultaneously applying the slurry for forming a porous ceramics membrane to the fitting portion and a surface of the filter body on a gas outflow side.

In a nineteenth aspect of the invention, a method of producing a gas filter module is provided wherein, in the fifteenth aspect, the ring-like support member is calcined at 1,450° C. or lower to attain a state which is immediately before final shrink is completed.

In a twentieth aspect of the invention, a method of producing a gas filter module is provided wherein the method comprises the steps of: preparing a filter body consisting of a porous ceramics member; preparing a ring-like support member consisting of dense ceramics; filling slurry into a joined portion of the filter body and the ring-like support member, then fitting the filter body and the ring-like support member, drying and dewaxing the filling slurry, and heating in a hydrogen chloride atmosphere of 700 to 1,800° C., the filling slurry being obtained by mixing a solvent, a dispersing agent, and a binder into high-purity ceramics powder; preparing a housing having a gas inlet port and a gas outlet port; and attaching the ring-like support member integrated with the filter body, into the housing.

In the invention, for example, the filter body has a tubular shape such as a cylindrical shape or a rectangular cylindrical shape, or a plate-like shape. The side wall portion or the like of the filter body primarily blocks a gas flow, and allows a gas to pass from one face side of the wall portion to the other face side while filtering out impurity fine particles and the like.

Therefore, it is assumed that the filter body is a porous member of a porous degree at which filtering of impurity fine particles is enabled and a gas is sufficiently allowed to pass through the member. Generally, the filter body is a porous ceramics sintered member in which a porous ceramics membrane having a man pore diameter of, for example, 0.5 to 1.5 μm is formed on an inner wall face of a porous support member having a pore diameter of about 10 to 12 μm.

For example, the material of ceramics constituting the ring-like support member consisting of dense ceramics, the tubular filter body, and the like is alumina, silicon carbide, or zirconia. In the case of a filter other than that for a fluoric gas, silica may be used, but alumina is preferably used. In any case, the ring-like support member, the tubular filter body, and ceramics powder constituting the slurry for shielding are preferably made of a combination of the same materials from the view point that excellent integration is to be attained by shrink fitting of the ring-like support member and the tubular filter body.

In the invention, the dense ceramics plate is engaged with or fitted to the end portion of the tubular filter body on the side of gas inflow, and isolates the inner and outer wall sides of the tubular filter body from each other, and the wall portion functions as a part of a partition wall for defining a passage area of a gas flow.

In the case where the tubular filter body is of the one-end sealed type, a ring-like plate consisting of dense ceramics is disposed in a shrink fitting manner on the side of the other end which is opened. In the case where the tubular filter body is of the both-end opened type, one end is sealed by shrink fitting of dense ceramics, and a ring-like support member is disposed in a shrink fitting manner on the side of the other end, so that an isolated and partitioned region is defined by the wall portion of the tubular filter body.

When the filter module is used for producing a semiconductor device and in an usual manner, the dense ceramics plate and the ring-like support member are required to be the block of a gas flow, and hence are required to be made of gas impermeable dense ceramics. Generally, he dense ceramics plate and the ring-like support member are an alumina sintered member in which alumina powder of a mean grain diameter of, for example, about 0.1 to 0.2 μm is used as a material. Preferably, translucent alumina polycrystals of a mean crystal particle diameter of 1 to 40 μm are used as the alumina sintered member. When the particle diameter is smaller than 1 μm, it is required to use an alumina material of a super fine grain size and to sufficiently control the suppress of grain growth, thereby producing a problem in that the productivity is low. When the particle diameter is larger than 40 μm, an insufficient mechanical strength is attained so that, particularly, the strength against the clamping by means of the O-rings is not sufficient. It is a matter of course that the strength can be enhanced by thickening the dense ceramics plate and the ring-like support member. In the filter module, however, the maximum thickness is about 5 mm from the view point of the whole size of the filter module. When the thickness is set to be 5 mm or less, therefore, the above specific range is preferable. The mean crystal grain diameter is obtained in the following manner. An arbitrary place of a sintered member is observed under a microscope, and the maximum diameter of each crystal is deemed as the diameter of the crystal. An average of the diameters of crystals is taken to be set as the mean crystal grain diameter.

In the invention, it is preferable to conduct the shrink fitting and integration of the end portion of the tubular filter body and the dense ceramics plate or the ring-like support member, under a so-called calcined state because of the following reason. The dense ceramics plate and the ring-like support member which are made of ceramics are calcined in a state which is immediately before final shrink is completed, and set to a state in which they can be densed in final shrink. By contrast, the tubular filter body consisting of a porous ceramics sintered member is formed by using as a material a calcined member which is ground to form a shrink fitting face (joining face) with respect to the dense ceramics plate or the ring-like support member, and which can be converted into a porous sintered member by final sintering.

Thereafter, the dense ceramics plate or the ring-like support member and the end portion of the tubular filter body are positioned and fitted together. These components are calcined members. As required, prior to the positioning and fitting, a ceramics grain adhering layer is formed on both or one of joining faces between the tubular filter body and the ring-like porous ceramics support member. Thereafter, the components (in the latter case, the adhering layer) are sintered to form a ceramics joined portion, and the final sintering is conducted under temperature and time conditions in which ceramics of a calcined state can be sintered.

The heating temperature and time period for attaining the calcined state are determined in consideration of the mean grain diameter of the material and the dimensions and shape of the shaped member. In a porous alumina member having a porous ceramics membrane of a mean pore diameter of 0.8 μm, for example, grain growth (sintering) occurs in a heating process of 1,450 to 1,500° C. In order to maintain a required calcined state, therefore, the temperature of the heating process is selected so as to be lower than 1,450° C. The required calcined state is determined in consideration of, for example, the rate of shrinkage in the shrink fitting and the final sintering, and is at least a state which is immediately before final shrink is completed.

According to the first aspect of the invention, the ring-like support member consisting of dense ceramics is provided without using a shield member (ring-like support member) made of a synthetic resin, and hence no impurity gas is produced in, for example, a baking process before the use in a semiconductor device producing apparatus, so that a semiconductor device (article to be processed) is not damaged. In order to, even when the gas filter module repeatedly undergoes thermal hysteresis between about 600° C. and room temperature as a result of the baking process, prevent the coupling between the filter body and the ring-like support member consisting of dense ceramics from being impaired by thermal stress, it is more preferable to configure the ceramics fine powder of the filter body, the ring-like support member, and the slurry for shielding and used in the coupling of the filter body and the support member, by the same material.

Since the ring-like support member is fixed via the metal O-rings into the housing, a shield structure can be easily produced, the reliability with respect to gas leak is improved, and the shield structure is not impaired even when a corrosive gas passes through the gas filter module.

In the invention, an O-ring means any O-like ring including a ring which has an O-like section and is hollowed, that which has a C-like section and is hollowed, and that which is solid.

According to the second aspect of the invention, a structure is formed in which the filter body is tubular, a gas passes between the housing and the outer periphery of the filter body, and the gas enters the interior through the whole area of the outer periphery of the tubular filter body. Therefore, a filter structure of a specific surface area which is relatively large can be obtained in a relatively small space, whereby the filter efficiency can be improved.

The filter body is a porous ceramics member in which a porous ceramics membrane that practically filters the inflow gas is formed on the inner face of the member. Therefore, a structure in which both the strength and the filtering properties (the pressure drop and the like) are considered can be easily designed. In the invention, the porous ceramics membrane is not restricted to a monolayer and may be configured by plural membrane layers having different mean pore diameters, or a layer in which the mean pore diameter is obliquely distributed in the thickness direction.

According to the third to fifth aspects of the invention, an appropriate structure of the filter body can be selected in accordance with design parameters such as the kind of the gas to be used, and the flow rate and velocity of the gas.

According to the sixth and seventh aspects of the invention, the metal O-rings have a sectorial section shape, i.e., a shape in which an R (round) shape is formed in side opposite to the acute angle portion (the pivot side) and the ends of the opposite side are linearly connected to the acute angle portion. The O-rings are disposed so that the acute angle portion is positioned on the side of the metal housing. Therefore, the positioning and the positional stability of the O-rings can be ensured, and hence it is possible to obtain a further enhanced gas sealing property.

The O-rings are disposed so that the R-shaped portion of each of the O-rings is positioned on the side of the ring-like support member made of ceramics. Even when a pressure of a certain degree is applied, therefore, it is possible to prevent the load stress of the O-rings from being concentrated, so that the ring-like support member is not broken.

Preferably, the angle of the acute angle portion is set to be 10 to 90 degrees because, when the angle exceeds this range, the sealing property tends to be lowered. As the material of the metal O-rings, SUS or nickel is preferably used.

According to the eighth and ninth aspect of the invention, it is possible to surely prevent gas leak from occurring in the joined portion of the filter body and the ring-like support member. In a configuration in which the porous ceramics membrane is prolonged so as to cover the joined portion, there arises no problem even when the pore diameter of the high-purity porous ceramics constituting the joined portion is larger than that of the porous ceramics membrane portion of the filter body.

According to the tenth aspect of the invention, the high-purity alumina composition provides excellent resistance to corrosion. When the gas filter module is used in a semiconductor producing apparatus, the reliability is sufficiently ensured.

According to the eleventh to thirteenth aspects of the invention, it is possible to obtain a structure in which the filter body and the ring-like support member or the dense ceramics plate are joined together in a further enhanced strength.

According to the fourteenth aspect of the invention, the ring-like support member made of ceramics, and the filter body consisting of a porous calcined ceramics member are fitted together under a state where the member and the body are calcined to a state immediately before final shrink is completed and can be densed, and the fitted members are shrink fitted at the final sintering temperature so as to be integrated. Therefore, the composition in the joint interface is continuous and joining which is very strong can be enabled.

According to the fifteenth aspect of the invention, prior to the heating process for shrink fitting, slurry for shielding is filled into a fitting portion of the filter body and the ring-like support member. Therefore, it is possible to obtain a gas filter module having a further reliable sealing property.

According to the sixteenth aspect of the invention, after the shrink fitting and integration, a porous ceramics membrane is formed on the inner wall face of the filter body. Therefore, the joined portion can be covered by the ceramics membrane in a very easy manner, so that the joining is strong and the filtering property is high.

According to the seventeenth aspect of the invention, the filter body is formed into a plate-like shape, and, after the shrink fitting and integration, slurry for forming a porous ceramics membrane is applied to the surface of the filter body on the gas outflow side. Even when the porous ceramics sintered member in the joined portion has a relatively large pore diameter, therefore, pores can be covered by the ceramics membrane, and a gas filter module in which the joining is strong and which has a high filtering property can be obtained very easily.

According to the eighteenth aspect of the invention, the slurry for forming a porous ceramics membrane is simultaneously applied to the fitting portion and the surface of the filter body on the gas outflow side. Therefore, a gas filter module in which the joining is strong and which has a high filtering property can be obtained very easily.

According to the nineteenth aspect of the invention, it is possible to obtain a joining strength and a sealing property which are further reliable.

According to the twentieth aspect of the invention, after the filter body and the ring-like support member are fitted together, they are heated in a hydrogen chloride atmosphere of 700 to 1,800° C. Even when heated at 700 to 1,800° C., therefore, porous ceramics (particularly, alumina) of the joined portion is almost free from sintering shrink, and grains are grown without being substantially densed. Consequently, stress due to the heating is not produced in the joined portion, with the result that cracking or peeling does not occur and joining of high strength is enabled.

DESCRIPTION OF THE PREFERRED EMBODIMENTS

Figure 1:
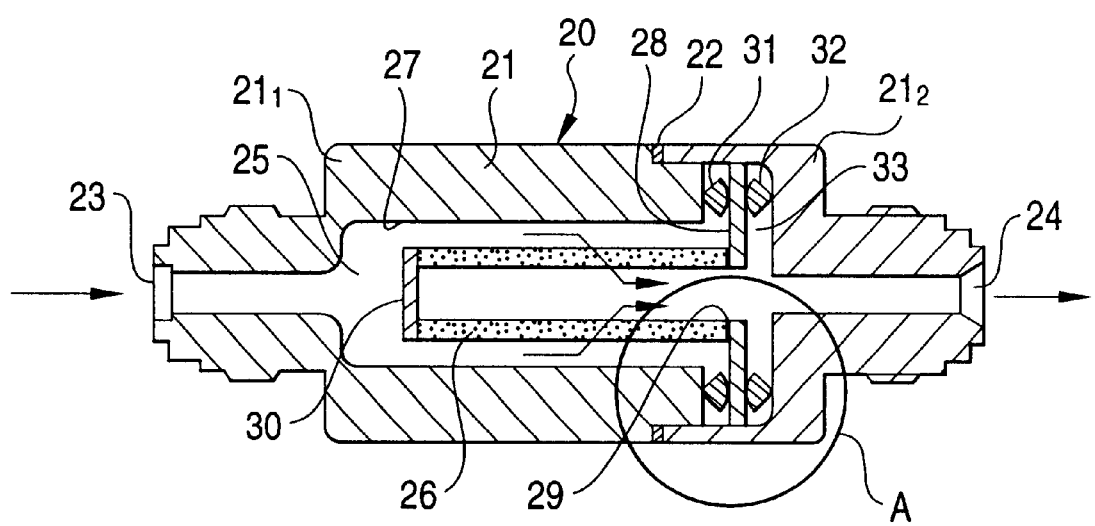
FIG. 1 is a side section view of a gas filter module of a first embodiment of the invention.

FIG. 1 is a section view of a gas filter module 20 which is an embodiment of the invention. Referring to FIG. 1, 21 denotes a housing, $21_1$ denotes a rear portion of the housing, and $21_2$ denotes a front portion of the housing. The housing 21 is assembled by integrally joining the housing rear portion $21_1$ and the housing front portion $21_2$ at a housing joined portion 22. The joining at the joined portion 22 may be realized by screwing, welding, or the like in the same manner of a gas filter module of the prior art.

Figure 13:
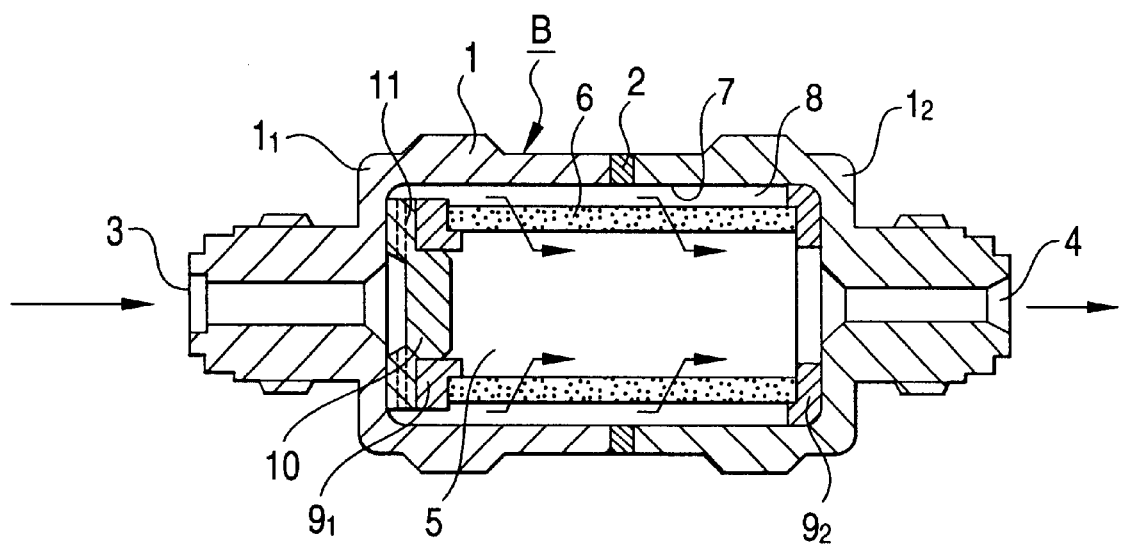
FIG. 13 is a side section view of a ceramics filter of the prior art.

A gas inlet port 23 for a gas to be filtered, and a gas outlet port 24 for a filtered gas are formed in the housing rear and front portions $21_1$ and $21_2$ of the housing 21, respectively. An inner space 25 is formed inside the center portion of the housing 21. A filter body 26 consisting of a porous ceramics member which filters a gas entering the inner space is disposed so as to form a gap between the body and the inner wall 27 of the housing 21. The above-mentioned configuration is identical with that of the prior art ceramics filter shown in FIG. 13.

The filter body 26 is configured by a porous alumina member, and has a tubular shape as illustrated. The rear end of the filter body 26 is closed by a dense alumina plate 30, so that a gas entering from the gas inlet port 23 of the gas filter module 20 is sent into a gap defined by the outer periphery of the filter body 26 and the housing inner wall 27. A ring-like support member 28 consisting of dense alumina ceramics is joined to the front end side of the filter body 26.

The filter body consists of a porous ceramics members, the dense ceramics plate, and the ring-like support member, each of which can be configured by, for example, one of alumina, silica, silicon carbide, and zirconia, or a combination of these materials. In order to attain excellent joining of the filter body and the plate or the ring-like support member, these components are preferably made of the same material. As a material which is suitable for a filter dedicated to filtration of a dry gas used in a production process of a semiconductor device, alumina is most preferable from the view points of resistance to high temperature, resistance to corrosion, and the like. In the case of a filter module for production of a semiconductor device, particularly, high purity of 99.9 wt. % is required.

Preferably, the dense alumina plate, and the ring-like support member 28 consisting of dense alumina ceramics have high purity and are free from a surface defect. When there is a surface defect, particles are formed during the use, and hence this is not preferable. In order to avoid this, it is particularly preferable to use translucent alumina. Translucent alumina is a dense and homogeneous material. In the case mechanical polishing is performed, it is easy for translucent alumina to form a non-defect surface state. The "dense alumina" means alumina ceramics sintered so that the theoretical density is more than 99.5%.

The dense alumina ring-like support member 28 may be joined to the filter body 26 by means of alumina silicate glass. It is further preferable to configure the joining by a joined portion 29 which is formed by a sintered alumina. When the joining of this portion is conducted by an alumina sintered member, unlike the joining using glass, it is possible to prevent a reaction between the alumina of the filter body and glass from occurring, and the excellent corrosion resistance of alumina can be sufficiently exhibited.

The joined portion 29 of the alumina sintered member may be configured by a dense sintered member. Preferably, the joined portion is configured by a porous sintered member having a pore diameter which is approximately equal to or smaller than that of a porous ceramics membrane that practically filters at least a gas entering the filter body.

Usually, the joined portion shrinks to be densed as sintering advances. As a result of the shrinking, residual stress exists in the interface of the joined portion and the ring-like support member consisting of dense alumina ceramics, and the portion tends to be relatively weak against a mechanical or thermal shock. When the joined portion is configured by the above-mentioned porous sintered member, shrink due to sintering of the joined portion is little produced, and hence the above-mentioned disadvantage does not occur. The dense alumina plate or the ring-like support member 28 consisting of dense alumina is joined to the filter body 26 by the joined portion 29 consisting of an alumina sintered member, in the following manner. In the following description, a case wherein the latter component, or the ring-like support member 28 is joined will be described.

High-purity alumina powder is mixed with a solvent, a dispersing agent, and a binder and the mixture is stirred to obtain slurry. The slurry is applied to the bonding face of the ring-like support member 28 consisting of a dense alumina sintered member, and one end of the filter body 26 consisting of a porous alumina sintered member is placed on the face and then bonded thereto. In this case, preferably, the bonding face of the ring-like support member 28 is previously processed by using a grinder or sand blast, or by a chemical etching process, so as to be formed into a rough face. One end of the porous filter body 26 is placed on one face of the ring-like support member 28, and then dried and bonded thereto. Thereafter, the members are heated in the air atmosphere to conduct a dewaxing process. The temperature of the dewaxing process is set to a temperature at which the high-purity alumina formed member used in the bonding does not conduct sintering shrink and the used binder can be sufficiently removed away. The temperature at which a formed member using a high-purity alumina material starts sintering shrink depends on the kind of the material, and usually is in the range of about 800 to 1,100° C. Also the temperature at which a binder can be sufficiently removed away depends on the kind of the material, and usually is at about 600° C.

After the dewaxing, sintering is conducted so that the joined portion is converted into porous alumina. At this time, the heat treatment may be conducted at a temperature (900–1500° C.) where denseness is not sufficiently attained in the air atmosphere or a hydrogen atmosphere, so as to obtain porous alumina. In this case, however, grains are weakly bonded together and the strength is reduced. In order to enhance the strength of porous alumina of the joined portion, the heat treatment may be conducted in a hydrogen chloride atmosphere. In this case, the high-purity alumina formed member portion used in the bonding produces little sintering shrink, and grains grow without being densed, so that the ring-like support member 28 and the porous filter body 26 are firmly coupled to each other. The temperature of the heat treatment in a hydrogen chloride atmosphere is set to be 700° C. or higher because, at a temperature lower than 700° C., alumina grains in the joined portion fail to sufficiently grow and satisfactory joining cannot be attained. The temperature is set to be 1,800° C. or lower because, when the heat treatment is conducted at a temperature higher than 1,800° C., the joined portion and the portion of the ring-like support member react with hydrogen chloride and the portions are largely damaged so as not to function as a filter. The hydrogen chloride atmosphere may contain nitrogen, hydrogen, argon, helium, neon, and the like, in addition to hydrogen chloride. However, it is not preferable that the hydrogen chloride atmosphere contains oxygen or water.

The other face of the porous filter body 26 is sealed by the alumina plate 30 in the strictly same manner as described above. The structure in which the alumina plate 30 and the ring-like support member 28 are joined to the porous filter body 26 in the method described above may be used as it is. Alternatively, a membrane having a filter function may be further formed in the porous member portion and the joined portion, and the resulting structure may be used.

In the structure in which the ring-like support member 28 consisting of dense alumina ceramics is joined to the filter body 26, as shown in FIG. 1, the ring-like support member 28 is clasped by metal O-rings 31 and 32 and fixed by means of the housing rear portion $21_1$ and the housing front portion $21_2$. Specifically, the ring-like support member 28 of the filter body 26 which is clamped by the metal O-rings 31 and 32 is inserted into a fixing gap 33 which is disposed inside the joined portion of the housing, so as to be fixed by means of the housing rear portion $21_1$ and the housing front portion $21_2$. According to this configuration, the filter body 26 is hermetically fixed into the housing 21 of the gas filter module 20.

Figure 2:
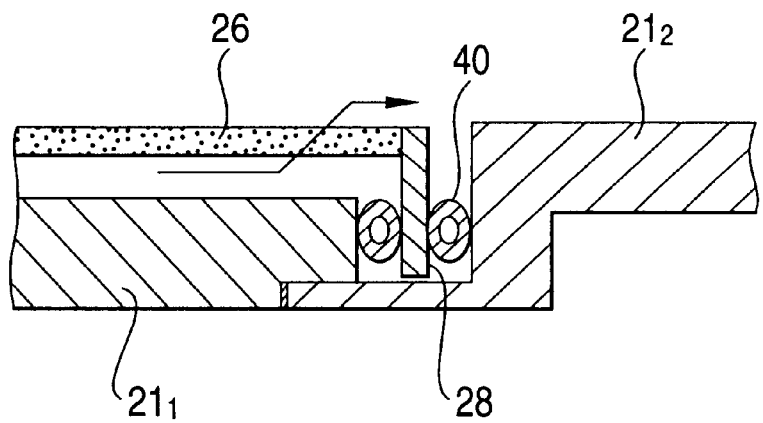
FIG. 2 is an enlarged section view of a part indicated by A of the gas filter module shown in FIG. 1, and showing a sate in which hollow O-rings collapse.

The O-rings used in this structure are made of a metal such as nickel metal or stainless steel, and are hollowed. When such hollow metal O-rings are used, however, the hollow O-rings 40 may collapse as shown in FIG. 2 depending on the usage form to impair the sealing property. In order to avoid such a situation, it is effective to modify the section shape of the O-rings so as to become the shape shown in FIG. 3.

Figure 3:
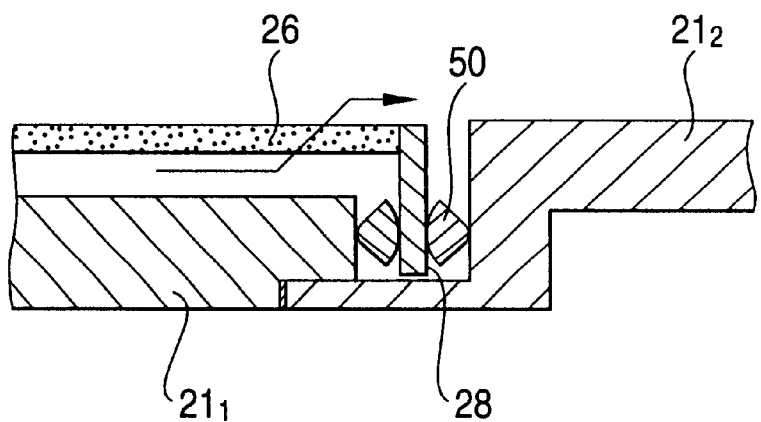
FIG. 3 is an enlarged section view of the part indicated by A of the gas filter module shown in FIG. 1, and showing a state in which O-rings having a sectorial section shape are used.

As shown in FIG. 3, O-rings 50 have a sectorial section shape. The pivotal sides of the sectorial shapes are positioned on the sides of the housing rear portion $21_1$ and the housing front portion $21_2$ which are made of a metal such as stainless steel, respectively, and the wider sides of the sectorial shapes are positioned on the side of the ring-like support member 28 of the filter body 26 of a porous alumina member. According to this structure, the pivot sides of the sectorial shapes where stress concentration easily occurs are disposed on the sides of the housings. Therefore, the positioning and the positional stability of the O-rings can be ensured, and hence it is possible to obtain a further enhanced gas sealing property. In FIGS. 2 and 3, the components are designated by same reference numerals as those of FIG. 1.

When a gas is to be filtered by using the ceramics filter, the gas flows into from a gas inlet pipe (not shown) connected to the gas inlet port 23 of the gas filter module 20, through the gas inlet port 23. The gas reaches the outside of the filter body 26. The gas which has entered the gap then passes through the filter body 26 as indicated by the arrow, whereby the gas is filtered and guided to the center portion of the filter body 26. Thereafter, the gas is sent from the center portion of the front end of the filter body 26 toward the housing front portion $21_2$, and then discharged from the gas outlet port 24 of the housing front portion $21_2$.

(Embodiment 1)

Twenty parts by weight of ion exchange water, 1 part by weight of polyvinyl alcohol serving as a binder, and 0.5 parts by weight of ammonium polyacrylate serving as a dispersing agent were added to 100 parts by weight of high-purity alumina powder of a mean grain diameter of 0.2 μm. These materials were mixed for a day and a night in a ball mill to form slurry. A ring-like support member of dense alumina ceramics was bonded by using the slurry, to an end face of a porous filter body of a monolayer consisting of high-purity alumina of a main pore diameter of 10 μm. A dense alumina plate was bonded by using the same slurry to the other end face of the porous filter body so as to seal the other end. Thereafter, the bonded article was heated at 600° C. for one hour in the air atmosphere to conduct a dewaxing process. The article was further processed at 1,750° C. for two hours in a hydrogen atmosphere to sinter the article, whereby the bonded portions were firmly bonded by alumina sintered members, respectively.

The filter body which was formed as described above was processed in a $ClF_3$ atmosphere at 30° C. for 120 minutes, and the damaged state of the joined portions was observed, with the result that no change was observed. The weight change was measured. Also the weight change was zero.

$ClF_3$ is a gas which is used as a cleaning gas in a semiconductor device production process. When a silicon nitride film ($Si_3N_4$) or a silicon oxide film ($SiO_2$) is formed by the CVD method in a semiconductor device production process, the silicon nitride film or the silicon oxide film is easily deposited also onto parts inside a CVD apparatus configured by a quartz glass pipe, etc. Therefore, the deposited film which may cause particles to be produced in the apparatus must be removed away. $ClF_3$ is usually used in the removal process.

(Embodiment 2)

Slurry was prepared in the same manner as Embodiment 1. A ring-like support member of dense alumina ceramics, and a dense alumina plate were bonded to end faces of a porous filter body of a monolayer consisting of high-purity alumina of a mean pore diameter of 10 μm, in the same manner as Embodiment 1. Thereafter, the bonded article was heated at 600° C. for one hour in the air to conduct a dewaxing process. The article was further processed at 1,500° C. for four hours in a hydrogen chloride atmosphere to sinter the article, whereby the bonded portions were firmly bonded by porous sintered alumina, respectively. The filter body was processed in a $ClF_3$ atmosphere at 30° C. for 120 minutes, and the damaged state of the joined portions was observed, with the result that no change was observed. The weight change was measured. Also the weight change was zero.

(Embodiment 3)

Figure 4:
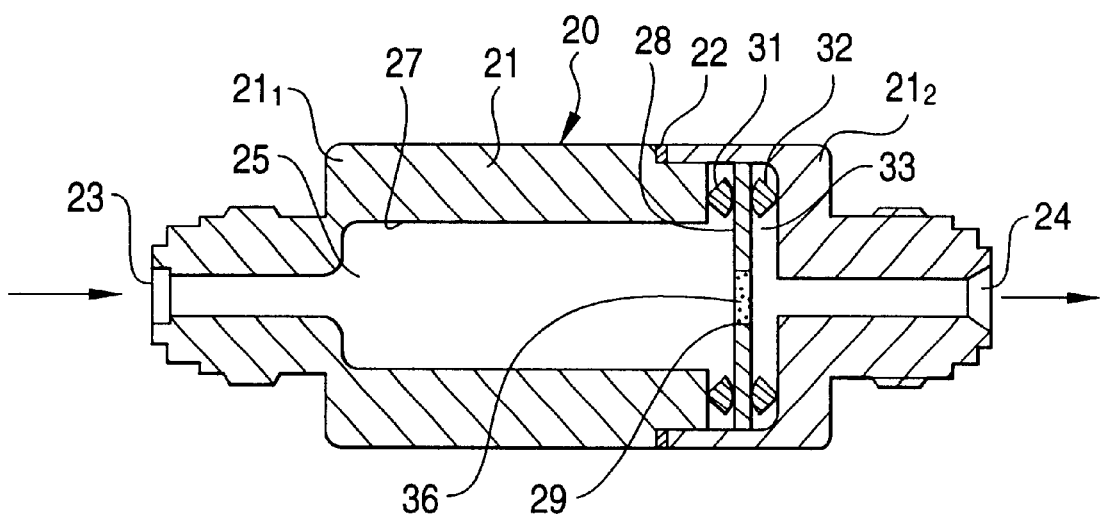
FIG. 4 is a side section view of a gas filter module of a second embodiment of the invention.

In the embodiment described above, a tubular filter body was used. In the embodiment described below, a plate-like filter body was used. FIG. 4 is a section view of a gas filter module 20 of an embodiment of the invention. The embodiment is different from the above-described embodiment, only in the shape of the filter body and the form of joining the filter body and the ring-like support member. The housing 21, and the structure of attaching the ring-like support member to the housing 21 are identical with those of the above-described embodiment, and the identical components are designated by same reference numerals.

Figure 5A:
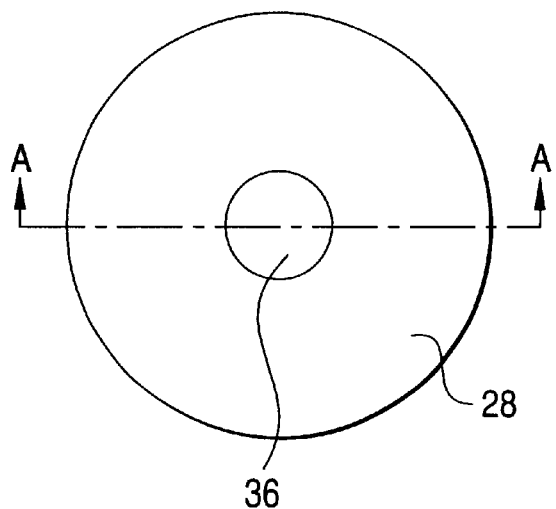
FIGS. 5A and 5B are plan views and a section view showing a filter body and a ring-like support member of the gas filter module.
Figure 5B:
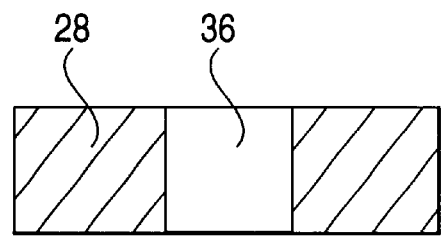

As shown in FIGS. 5A and 5B (FIG. 5A is a plan view, and FIG. 5B is a section view taken along the line A—A of FIG. 5A), a filter body 36 consists of a porous ceramic member which has a disk-like shape, i.e., a plate-like shape, and is mounted via a ring-like support member 28 so that a flat portion of the filter body extends in a direction which is substantially perpendicular to a gas flow direction in the space of the housing. The filter body 36 is fitted via slurry into a mounting hole H formed in the ring-like support member 28. In the same manner as the embodiment described above, the filter body is bonded by a heating process at 1,500° C. in a hydrogen chloride atmosphere.

Figure 6:
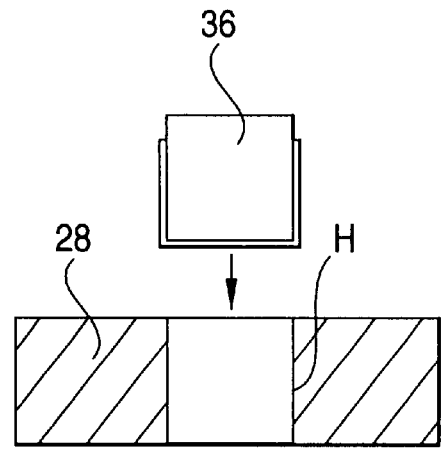
FIG. 6 is a view showing a production step of the filter body.

In the production, as shown in FIG. 6, the disk-like filter body is immersed in slurry, so that the slurry is applied to a part of the side face and the surface on the gas outflow side, excluding the face which serves as the gas inflow side. The filter body is then fitted into the mounting hole H of the ring-like support member 28, and dried and dewaxed at 70° C. for 20 hours. Thereafter, the filter body is heated in a hydrogen chloride atmosphere at 1,500° C. The ring-like support member which is joined to the filter body 36 in this way is mounted via O-rings in the space in the housing 21 in the same manner as the embodiment described above.

In this structure, a gas is caused to flow in and out along a direction perpendicular to the filter body. Although the filter area is small, the structure has an advantage that the gas can efficiently flow out without blocking the gas flow.

Figure 7A:
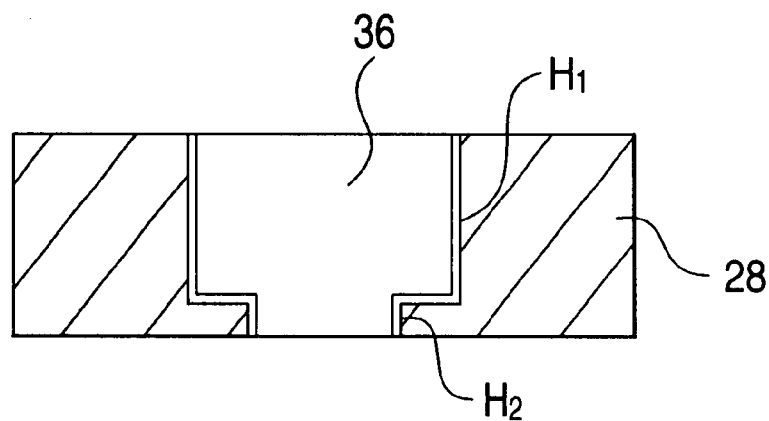
FIGS. 7A and 7B are views showing a modification of the filter body.
Figure 7B:
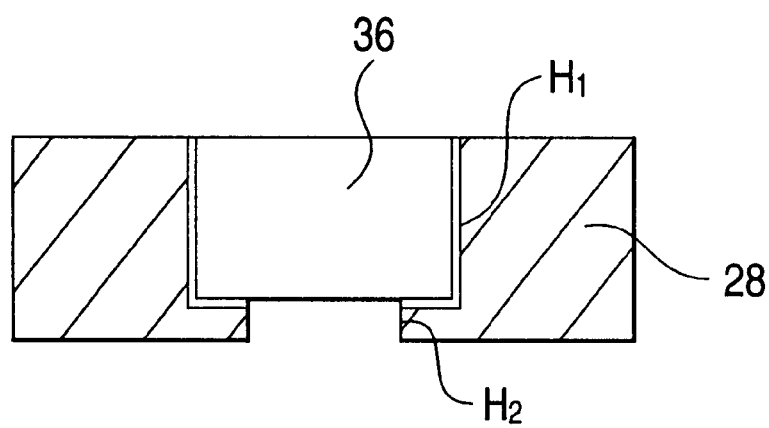

In modifications shown in FIGS. 7A and 7B, a two-step structure is formed in which the mounting hole of the ring-like support member 28 is configured by a large-diameter hole H1 positioned on the gas inflow side, and a small-diameter hole H2 positioned on the gas outflow side. As shown in FIG. 7A, the filter body 36 may have a two-step structure corresponding to the ring-like support member 28, or, as shown in FIG. 7B, a usual plate-like structure.

The joining of the two members may be realized by the structure and the forming method shown in FIG. 5 and the slurry bonding, or by shrink fitting joining which will be described later. Alternatively, shrink fitting may be conducted after slurry is filled. In the alternative, slurry for forming a porous ceramics membrane 33 which practically filters a gas is applied so as to cover also a part of the surface of the ring-like support member on the outflow side, and then sintered, whereby a filter which has a high filtering property and in which the joining is strong can be obtained very easily.

(Embodiment 4)

Figure 8:
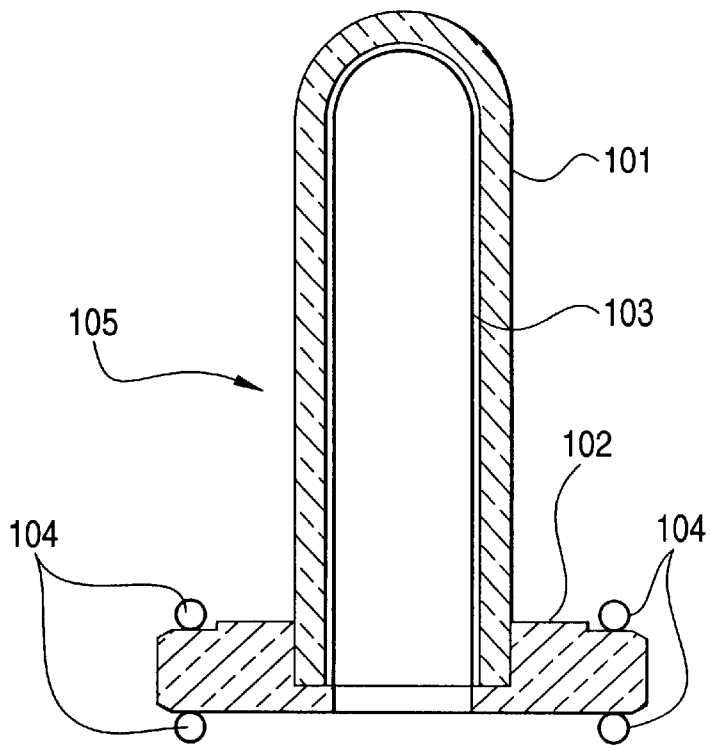
FIG. 8 is a section view showing an example of the structure of main portions of the gas filter module of the invention.

FIG. 8 is a section view showing of the configuration of main portions of a gas filter module of the embodiment. Referring to FIG. 8, 101 denotes a tubular filter body in which one end is sealed and which consists of a porous ceramics member, and 102 denotes a ring-like support member which is shrink fitted, joined and integrated with an end portion of the filter body 101, and which consists of dense ceramics that forms a wall portion of the filter body 101 as a passage area of a gas flow. In the embodiment, for example, the tubular filter body 101 is made of an porous alumina member, and the ring-like support member 102 is made of gas impermeable dense alumina.

The ring-like support member 102 is shrink fitted, joined and integrated with the filter body 101. The ring-like support member 102 is disposed by shrink fitting on an outer peripheral face of the open end portion of the filter body 101, so that a wall portion of the filter body 101 is formed as a passage area of a gas flow. The inner and outer wall faces of the tubular filter body 101 are isolated from each other.

The reference numeral 103 denotes a porous ceramics membrane which is formed on the inner wall face of the tubular gas filter body 101 and has communicating pores that are finer than those of the porous alumina member. The porous ceramics membrane serves as a filter portion which practically conducts the gas filtration. The reference numeral 104 denotes O-rings which are to be interposed between sealing and fixing faces of a housing of the gas filter module. The faces on which the O-rings 104 are disposed are subjected to a grinding process.

Next, an example of a method of producing the thus configured filter body will be described.

First, a binder of an amount corresponding to 2 wt. % is added to a mixture of 90% of alumina coarse grains of a grain diameter of 10 to 30 $\mu$m and a mean grain diameter of 18 $\mu$m, and 10% of alumina coarse grains of a grain diameter of 0.1 to 0.2 $\mu$m. The addition result is stirred and mixed, dried under a reduced pressure at 45 to 50° C., and then subjected to granulation so as to prepare a raw material.

The prepared granular powder is subjected to molding by a rubber press at 100 to 150 Mpa to prepare a cylindrical member (for the tubular gas filter body) in which one end is sealed.

Next, the molded member is heated at 1,200 to 1,400° C. to obtain a calcined member. The outer peripheral face of the open end portion of the calcined member (the shrink fitting portion of the shield member 102) is ground.

On the other hand, to fine alumina grains of a grain diameter of 0.05 to 0.1 $\mu$m, a binder of an amount corresponding to 2 wt. % of the fine alumina grains is added. The addition result is stirred and mixed, dried under a reduced pressure at 45 to 50° C., and then subjected to granulation so as to prepare a raw material. The prepared granular powder is subjected to press molding by a die press at 20 kgf/cm². The molded member is heated at 1,200 to 1,400° C. to obtain a ring-like support member made of alumina. A hole into which the outer peripheral face of the open end portion of the cylindrical member (calcined member) wherein one end is sealed is opened in the ring-like support member made of alumina. At this time, the dimensions are determined in consideration of the rate of shrink at the temperature (shrink fitting temperature) at which the cylindrical member having the sealed one end and the ring-like support member are joined and sintered.

Figures 9A, 9B:
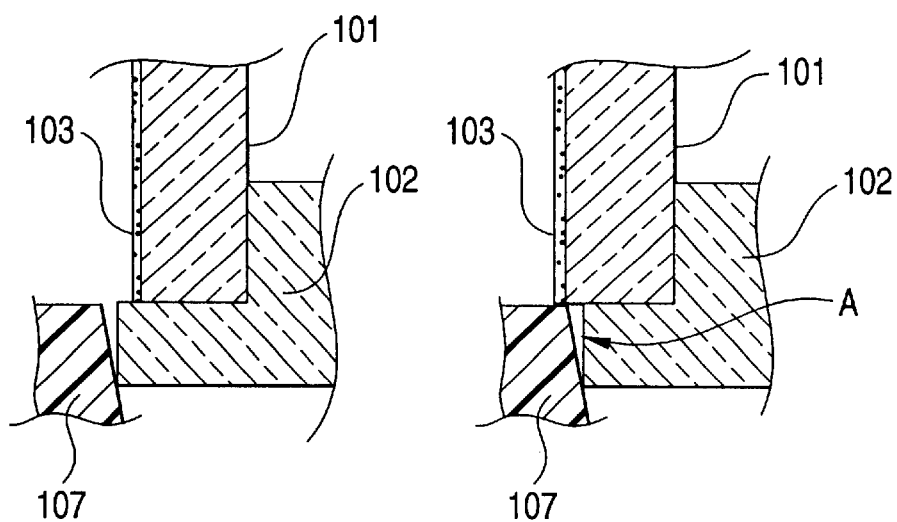
FIG. 9A is a section view showing an example of the dimensions of a joined portion of a ring-like support member with respect to a filter body in the configuration of the gas filter module of the invention.
FIG. 9B is a section view showing an example of the dimensions of a joined portion of a ring-like support member with respect to a filter body in a gas filter module of a comparative example.

FIGS. 9A and 9B diagrammatically show an example of setting of the dimensions. As shown in a section view of FIG. 9A, the hole of the ring-like support member 102 of this embodiment is opened so that, after joining, shrink fitting, and sintering are conducted on the open end face of the cylindrical member 101, the diameter of the through hole is smaller than the inner diameter of the cylindrical member 101. When, as shown in section in FIG. 9B, the hole of the ring-like support member 102 of a conventional filter module is opened so that, after joining, shrink fitting, and sintering are conducted on the open end face of the cylindrical member 101, the diameter of the through hole is larger than the inner diameter of the cylindrical member 101, there arises the following disadvantage. When a ceramics membrane 103 serving as a practical gas filter portion is then formed on the inner wall face of the cylindrical member 101 by using alumina slurry, a portion A where the porous ceramics membrane 103 is not formed remains to exist.

When the fitting diameter of the ring-like support member 102 into which the cylindrical member 101 is fitted is smaller than the outer peripheral diameter of the cylindrical member 101 by 3% or more, the ring-like support member 102 is deformed after joining, shrink fitting, and sintering, and a gap of at least about 0.2 mm is formed between the fitting faces. In the case where the gap is larger than 0.2 mm, even when slurry for forming the ceramics membrane 103 serving as a gas filter portion fills the gap as a side effect or the slurry for joining fills the gap, cracks are easily produced during the sintering of the ceramics membrane 103. When the gap is 0.1 mm or less, the sealing can be attained by filling the gap with the shield slurry. Therefore, the dimensions of the hole of the ring-like support member 102, and the like must be set in consideration of such phenomena.

Next, the open end side of the cylindrical member 101 is fitted and positioned to the ring-like support member 102. The joined article is heated at 1,820° C. in a hydrogen gas atmosphere so that the cylindrical member 101 and the ring-like support member 102 which are fitted to each other are sintered, and joined and shrink fitted to be integrated. After the joining and shrink fitting integration, the faces of the regions of the ring-like support member 102 where the O-rings 104 are to be disposed are subjected to a grinding process.

Figure 10:
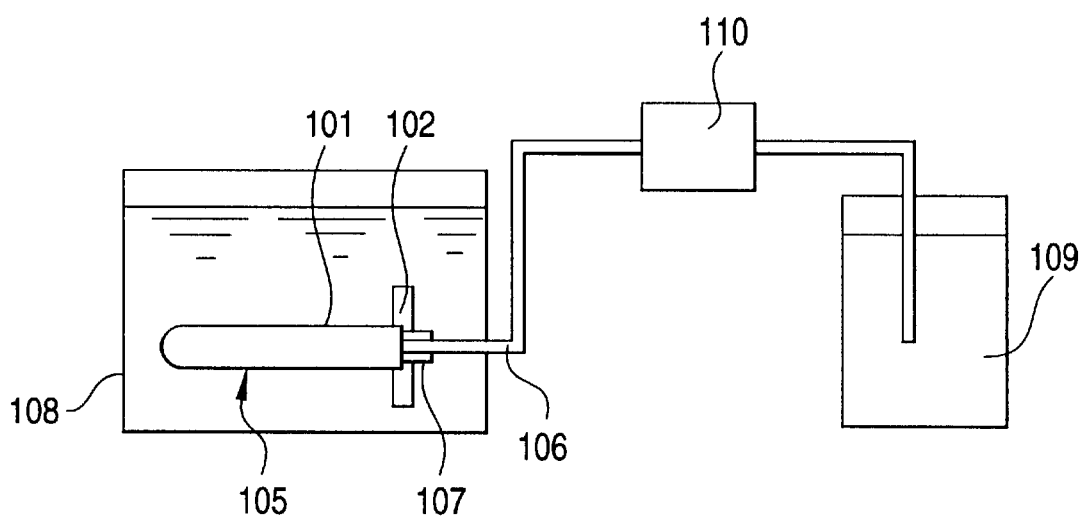
FIG. 10 is a diagram showing a step of applying slurry for forming a membrane having a small pore diameter on an inner wall face of the filter body in an production example of the gas filter module of the invention.

As diagrammatically shown in FIG. 10, thereafter, a silicone rubber plug 107 through which a slurry supply pipe 106 is passed is inserted into the opening of the shrink-fitted article 105 of the cylindrical member 101 and the ring-like support member 102. The article is then immersed into water of a tank 108, and slurry 109 of a concentration of 1 to 10 wt. % of alumina grains of a mean grain diameter of 1.2 $\mu$m is supplied to the article via a tubing pump 110, whereby the ceramics grain adhering layer 103 of a thickness of 20 to 30 $\mu$m is formed on the inner wall face of the cylindrical member 101. As a result of the formation of the membrane 103 by the supply of the slurry 109, the gap in the joining and shrink fitting region of the cylindrical member 101 and the ring-like support member 102, and the like are filled and sealed.

After the membrane is formed by the supply of the slurry 109, the article was dried at 70 to 80° C. for 2 to 3 hours, and then subjected to a sintering process at 1,100 to 1,500° C., thereby producing a gas filter having the ceramics membrane 103 of a mean pore diameter of 0.8 $\mu$m.

The thus produced gas filter is not inferior in joining strength and shield property than a prior art gas filter in which integration is conducted by, for example, a glass bonding agent. Even when the gas filter came into contact with a fluoric gas, a damage of the joined portion, contamination of a filtered gas by impurities, and the like were not observed.

(Embodiment 5)

The cylindrical member 101 and the ring-like support member 102 were produced under the same conditions as those of Embodiment 1 except that mixture powder of 90% of vaterite coarse grains of a mean grain diameter of 20 $\mu$m and 10% of zirconia partially stabilized by yttria coarse grains of a grain diameter of 2 to 3 $\mu$m was used as the material constituting the cylindrical member 101, vaterite fine grains of a mean grain diameter of 0.1 to 0.2 $\mu$m was used as the material constituting as the ring-like support member, and the calcining temperatures of these materials were set to be 1,400 to 1,600° C. After the cylindrical member 101 and the ring-like support member 102 were sintered, and joined and shrink fitted to be integrated together, slurry of a concentration of 1 to 10 wt. % of zirconia powder of a mean grain diameter of 1.5 $\mu$m is supplied to the article via a tubing pump, whereby a membrane of a thickness of 20 to 30 $\mu$m is formed on the inner wall face of the cylindrical member 101. As a result of the formation of the membrane by the supply of the slurry, the gap in the joining and shrink fitting region of the cylindrical member 101 and the ring-like support member 102, and the like are filled and sealed.

After the membrane was formed by the supply of the slurry, the article was dried at 70 to 80° C. for 2 to 3 hours, and then subjected to a sintering process at 1,200 to 1,350° C., thereby producing a filter body having the zirconia membrane 103 of a mean pore diameter of 1 $\mu$m serving as a filter.

The thus produced filter body is not inferior in joining strength and shield property than a prior art filter body in which integration is conducted by, for example, a glass bonding agent. Even when the filter body came into contact with a fluoric gas, a damage of the joined portion, contamination of a filtered gas by impurities, and the like were not observed.

(Embodiment 6)

The cylindrical member 101 and the ring-like support member 102 were produced under the same conditions as those of Embodiment 3 except that silica coarse grains of a mean grain diameter of 40 $\mu$m was used as the material constituting the cylindrical member 101, and silica fine grains of a mean grain diameter of 0.1 to 0.2 $\mu$m was used as the material constituting as the ring-like support member, and the calcining temperatures of these materials were set to be 1,400° C. After the cylindrical member 101 and the ring-like support member 102 were sintered, and joined and shrink fitted to be integrated together, slurry of a concentration of 1 to 10 wt. % of silica powder of a mean grain diameter of 0.7 $\mu$m is supplied to the article via a tubing pump, whereby a silica membrane of a thickness of 20 to 30 $\mu$m is formed on the inner wall face of the cylindrical member 101. As a result of the formation of the membrane, the gap in the joining and shrink fitting region of the cylindrical member 101 and the ring-like support member 102, and the like are filled and sealed.

After the membrane was formed by the slurry, the article was dried at 70 to 80° C. for 2 to 3 hours, and then subjected to a sintering process at 1,250° C., thereby producing a filter body having the silica membrane 103 of a mean pore diameter of 0.2 $\mu$m.

The thus produced filter body is not inferior in joining strength and shield property than a prior art filter body, and a damage of the joined portion, contamination of a filtered gas by impurities, and the like were not observed.

(Embodiment 7)

Figure 11:
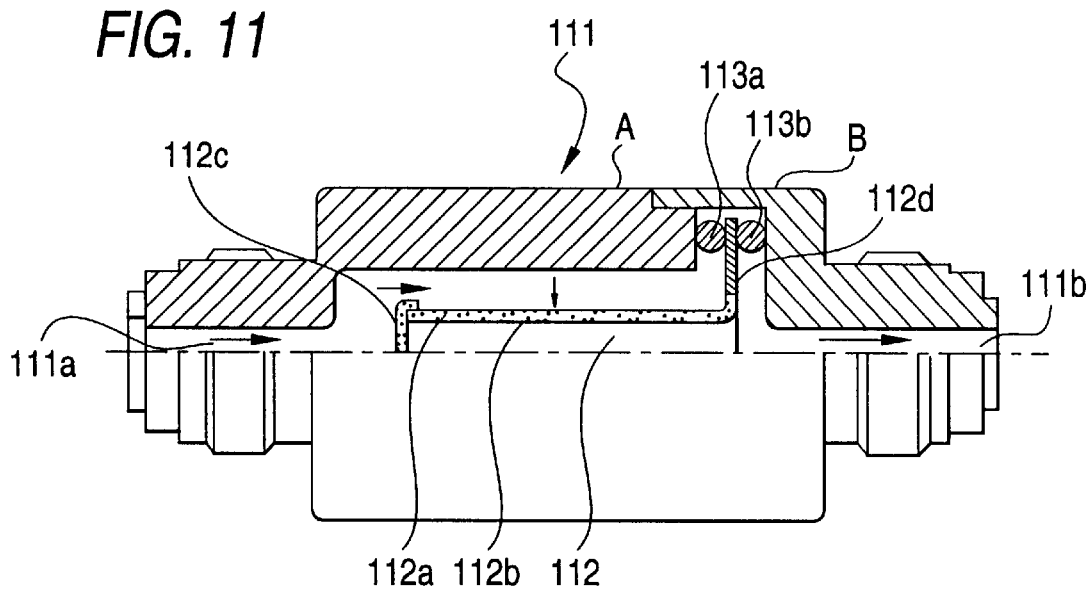
FIG. 11 is a partial cutaway view showing an example of the structure of the gas filter module of the invention.

FIG. 11 is a partial cutaway view showing an example of the configuration of main portions of the gas filter module of the embodiment. Referring to FIG. 11, 111 denotes a housing having a gas inlet port 111a and a gas outlet port 111b, and 112 denotes a filter body which is disposed in a gas flow path of the housing 111 so as to block the gas flow path. The housing 111 is made of a metal (for example, SUS316L double melt), and configured by welding or joining of two split members A and B. The filter body 112 comprises: a cylindrical (tubular) filter support base 112a consisting of a porous alumina member; a porous ceramics membrane 112b formed on the inner wall face of the filter support base 112a; and a plate 112c and a ring-like support member 112d which consist of gas impermeable dense alumina serving so as to shield the filter support base 112a from the housing 111, thereby allowing a gas flow to pass through the wall portion of the filter support base 112a.

Figure 12:
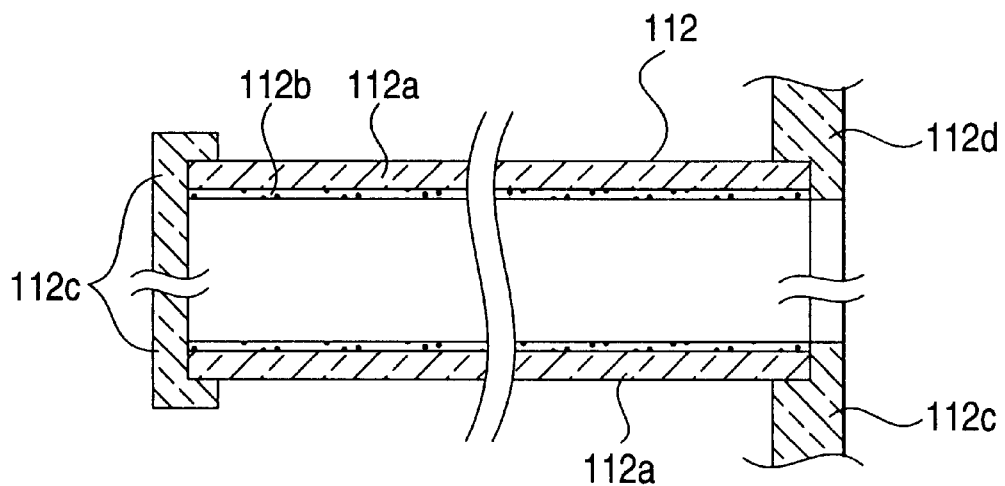
FIG. 12 is a partial enlarged section view showing an example of the shrink fitting structure of the gas filter module of the invention.

In other words, the filter body 112 is formed by: the tubular filter support base 112a serving as a support base for the porous ceramics membrane 112b; the ring-like support member 112d which is in the metal housing 111 and seals the opening on the side of the gas inlet port 111a of the filter support base 112a; and the ring-like support member 112d which is on the side of the gas outlet port 111b (the other end face) of the filter support base 112a and operates so as to shield the filter support base 112a from the inner wall face of the metal housing 111. As enlargedly shown in section in FIG. 12, the joining and integration of the plate 112c and the ring-like support member 112d to the filter support base 112a is conducted by shrink fitting. In FIG. 11, 113a and 113b denote metal O-rings which are opposingly contacted with a face of the ring-like support member 112d and the inner wall face of the metal housing 111, respectively. The O-rings function so as to fix and hold the ring-like support member 112d and block the gas flow.

In this configuration, the gas flow (arrow) from the gas inlet port 111a flows toward the outer peripheral face of the gas filter body 112. The flow direction is blocked by the plate 112c and the ring-like support member 112d, and hence the gas flow is passed (or filtrated) through the wall portion of the filter support base 112a, further passed through the porous ceramics membrane 112b formed on the inner wall face of the filter support base 112a, and then flows to the gas outlet port 111b. In other words, while the filter support base 112a primarily functions as a barrier plate or a baffle against the gas inflow, and filtrates the flowing gas, the filter support base finally conducts filtration and cleaning by means of the porous ceramics membrane 112b.

The invention is not restricted to the embodiments described above, and may be adequately modified without departing from the spirit of the invention. For example, the filter body may have a rectangular cylindrical shape in place of a round cylindrical shape, or may be configured by a bottomed cylinder or rectangular cylinder. It is a matter of course that, in accordance with the structure or shape of the tubular filter body, the structure or shape of the plate 112c and the ring-like support member 112d may be changed. In other words, the structure and the shape may be arbitrarily set in accordance with the use and the usage form.

According to the invention, a glass bonding agent or the like does not exist in the joined portion of the filter body made of ceramics and the ring-like support member made of ceramics or the dense ceramics plate, and hence gas release and contamination due to the bonding agent can be surely avoided.

Furthermore, also filtration of a fluoric gas is enabled. In other words, filtration and cleaning of a dry gas can be easily conducted without being restricted by the kind of the gas and without causing contamination of the gas. Therefore, the invention can improve the quality of the production of a semiconductor device.

According to the invention, since a packing made of a synthetic resin is not used, it is possible to obtain a gas filter module which is very excellent in heat resistance. When the filter body and the ring-like support member of dense ceramics are joined to each other by a sintered ceramics member, all of the filter body, the ring-like support member, and the coupling member which joins them together are configured by ceramics. When these components are combined with metal O-rings, therefore, the gas filter module is provide with very excellent corrosion resistance and can be stably used during a long term for filtration of any kind of gas.

According to the invention, the filter body is fitted to the ring-like support member or the dense plate which is calcined to a state immediately before final shrink is completed, and shrink fitting is then conducted. Therefore, the strength of the joined portion is enhanced, and a gas filter which is excellent in performance, durability, versatility, and the like can be provided in mass production and at a high yield.

The joined portion of the gas inflow end portion of the filter body and the dense ceramics plate, and that of the other end of the same filter body and the ceramics ring-like support member are formed as sintered ceramics members by applying slurry obtained by mixing a solvent, a dispersing agent, and a binder into high-purity ceramics powder, conducting the joining, drying and dewaxing, and heating in a hydrogen chloride atmosphere at 700 to 1,800° C. Therefore, the joined portions can be sintered while the ceramics sintered members in the joined portions hardly shrink, so that the ceramics plate and the ring-like support member can be firmly joined ot the filter body. This effect is particularly noticeable in the case where the ceramics material is made of alumina. Consequently, this configuration is effective in production of a semiconductor device.

What is claimed is:

1. A gas filter module comprising:

a hosing which has a gas inlet port at one end and a gas outlet port at another end, and which is divided into two portions in a longitudinal direction;

a filter body consisting of a porous ceramics member which is disposed in said housing and through which an inflow gas passes; and a ring-like support member which is distinct in composition from said filter body and which consists of dense ceramics and is fittingly coupled to a step portion formed inside said housing and which is integrally joined to said filter body by shrink fitting, said ring-like support member being fixed via two metal O-rings to a fixing gap of said step portion of said housing and supporting said filter body in a spaced, contact-free relationship with the metal O-rings and said housing.

2. A gas filter module according to claim 1, wherein said filter body has a hollow tubular shape and is disposed in said housing leaving a gap between an inner wall portion of the housing and an outer wall portion of the filter body through which a gas passes, and wherein said filter body consists of a porous ceramics member in which a porous ceramics membrane that practically filters the inflow gas is formed on an inner face of said porous ceramics member.

3. A gas filter module according to claim 2, wherein an end portion of said filter body on a side of the gas inlet is closed by a dense ceramics plate which is distinct in composition from said filter body.

4. A gas filter module according to claim 2, wherein an end portion of the hollow tubular filter body on a gas inlet side thereof is closed by a dome-like member which is made of a same material as a material of said porous ceramics member constituting said filter body.

5. A gas filter module according to claim 1, wherein said filter body has a plate-like shape, and is disposed in a space in said housing so as to orient a flat portion of said filter body to be substantially perpendicular to a gas flow direction, and wherein said filter body consists of a porous ceramics member in which a porous ceramics membrane, that practically filters the inflow gas, is formed on a surface on a gas outlet side of said filter body.

6. A gas filter module comprising:

a housing which has a gas inlet port at one end and a gas outlet port at another end, and which is divided into two portions in a longitudinal direction;

a filter body consisting of a porous ceramics member which is loaded into said housing and through which an inflow gas passes; and a ring-like support member consisting of dense ceramics which is fittingly coupled to a step portion formed inside said housing and which is joined to said filter body, said ring-like support member being fixed via two metal O-rings to a fixing gap of said step portion of said housing wherein said filter body has a tubular shape and is loaded in a space in said housing with leaving in an outer periphery a gap through which a gas passes, and said filter body consists of a porous ceramics member in which a porous ceramics membrane that practically filters the inflow gas is formed on an inner face of said porous ceramics member, and wherein said metal O-rings have a sectorial shape in section, a pivot side of the sectorial shape is positioned on the side of said housing, and a wide side of the sectorial shape is positioned on the side of said ring-like support member joined to said filter body.

7. A gas filter module comprising:

a housing which has a gas inlet port at one end and a gas outlet port at another end, and which is divided into two portions in a longitudinal direction;

a filter body consisting of a porous ceramics member which is loaded into said housing and through which an inflow gas passes; and a ring-like support member consisting of dense ceramics which is fittingly coupled to a step portion formed inside said housing and which is joined to said filter body, said ring-like support member being fixed via two metal O-rings to a fixing gap of said step portion of said housing wherein said filter body has a plate-like shape, and is loaded in a space in said housing with setting a flat portion of said filter body to be substantially perpendicular to a gas flow direction, and said filter body consists of a porous ceramics member in which a porous ceramics membrane that practically filters the inflow gas is formed on a surface on a gas outlet side, and wherein said metal O-rings have a sectorial shape in section, a pivot side of the sectorial shape is positioned on the side of said housing, and a wider side of the sectorial shape is positioned on the side of the said ring-like support member joined to said filter body.

8. A method of producing a gas filter module, comprising the steps of:

roughening a face portion of a filter body;

positioning and fitting the roughened face portion of the filter body into a predetermined portion of a ring-like support member made of ceramics which is calcined to a state immediately before final shrink is completed and which can be increased in density, the filter body consisting of a porous calcined ceramics member which is distinct in composition from the ring-like support member;

conducting a heating process on the fitted ring-like support member and the filter body at a final sintering temperature, thereby shrink fitting and integrating the ring-like support member with the filter body; and supporting said ring-like support member integrated with the filter body, in a housing having a gas inlet port and a gas outlet port, using metal O-rings in a manner that ring-like support member is supported in the housing by the O-rings and so that the filter body is supported in the housing in a spaced contact free relationship with the O-rings and the housing.

9. A method of producing a gas filter module according to claim 8, wherein said shrink fitting and integrating step comprises a step of, prior to said heating process, filling a shielding slurry into a fitting portion of the filter body and the ring-like support member.

10. A method of producing a gas filter module according to claim 9, wherein the filter body is formed into a tubular shape, and, after the shrink fitting and integration, a porous ceramics membrane is formed on an inner wall face of the filter body.

11. A method of producing a gas filter module according to claim 9, wherein the filter body is formed into a plate-like shape, and, after the shrink fitting and integration, applying a porous ceramics membrane to a surface of the filter body on a gas outflow side.

12. A method of producing a gas filter module according to claim 9, wherein the shielding slurry is a slurry for forming a porous ceramics membrane, and wherein said method further comprises a step of simultaneous applying said slurry to the fitting portion and a surface of said filter body on a gas outflow side.

13. A method of producing a gas filter module according to claim , wherein the ring-like support member is calcined at 1,450° C. or lower to attain the state which is immediately before final shrink is completed.

14. A method of producing a gas filter module, comprising the steps of:

preparing a filter body consisting of a porous ceramics member;

preparing a ring-like support member consisting of dense ceramics distinct in composition from that of the filter body;

filling slurry into a joined portion of the filter body and the ring-like support member, then fitting the filter body and the ring-like support member together, drying and dewaxing the filling slurry, and heating in a hydrogen chloride atmosphere of 700 to 1,800° C., the filling slurry being obtained by mixing a solvent, a dispersing agent, and a binder into high-purity ceramics powder; and supporting the integrated ring-like support member integrated and filter body, in a housing having a gas inlet port and a gas outlet port, using metal O-rings in a manner that the ring-like support member is supported in the housing by the O-rings and so that the filter body is supported in the housing in a spaced; contact-free relationship with the O-rings and the housing.

* * * * *